(12) United States Patent
Yamauchi et al.

(10) Patent No.: US 10,303,761 B2
(45) Date of Patent: May 28, 2019

(54) METHOD, NON-TRANSITORY COMPUTER-READABLE RECORDING MEDIUM STORING A PROGRAM, APPARATUS, AND SYSTEM FOR CREATING SIMILAR SENTENCE FROM ORIGINAL SENTENCES TO BE TRANSLATED

(71) Applicant: Panasonic Intellectual Property Management Co., Ltd., Osaka (JP)

(72) Inventors: Masaki Yamauchi, Osaka (JP); Nanami Fujiwara, Nara (JP); Masahiro Imade, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 37 days.

(21) Appl. No.: 15/697,489

(22) Filed: Sep. 7, 2017

(65) Prior Publication Data

US 2018/0089169 A1 Mar. 29, 2018

(30) Foreign Application Priority Data

Sep. 27, 2016 (JP) .................................. 2016-187711
May 15, 2017 (JP) .................................. 2017-096570

(51) Int. Cl.
*G06F 17/27* (2006.01)
*G06F 17/28* (2006.01)
*G06F 17/22* (2006.01)

(52) U.S. Cl.
CPC ...... *G06F 17/2755* (2013.01); *G06F 17/2264* (2013.01); *G06F 17/2795* (2013.01); *G06F 17/2827* (2013.01); *G06F 17/2845* (2013.01)

(58) Field of Classification Search
None
See application file for complete search history.

(56) References Cited

U.S. PATENT DOCUMENTS 8,560,297 B2 * 10/2013 Quirk .................. G06F 17/2827
382/229
8,959,020 B1 * 2/2015 Strope .................. G10L 15/187
704/257

(Continued)

FOREIGN PATENT DOCUMENTS

| JP | 2003-022264 | 1/2003 |
| JP | 2005-339043 | 12/2005 |
| JP | 2011-090394 | 5/2011 |

*Primary Examiner* — Neeraj Sharma
(74) *Attorney, Agent, or Firm* — Greenblum & Bernstein, P.L.C.

(57) ABSTRACT

In a method of creating similar sentences from an entered original, one or more second phrases having the same meaning as a first phrase, which is part of the original, are extracted from a first database; an N-gram value is calculated according to a context dependence value, in a second database, corresponding to the one or more second phrases; one or more contiguous third phrases that include a number of second phrases equivalent to the N-gram value are extracted from one or more sentences obtained by replacing, in the original, the first phrase with the one or more second phrases; the appearance frequency of the one or more third phrases in a third database is calculated; and if the calculated appearance frequency is determined to be larger than or equal to a threshold, the one or more sentences are used as similar sentences of the original and are externally output.

11 Claims, 7 Drawing Sheets

| TO-BE-REPLACED PART | TO-BE-SUBSTITUTED CHARACTER STRING CANDIDATE |
|---|---|
| ⋮ | ⋮ |
| これだ / KOREDA (THIS) | これです / KOREDESU (THIS) |
| これだ / KOREDA (THIS) | これでございます / KOREDEGOZAIMASU (THIS) |
| ⋮ | ⋮ |
| 話せない / HANASENAI (CANNOT SPEAK) | 話せません / HANASEMASEN (CANNOT SPEAK) |
| 話せない / HANASENAI (CANNOT SPEAK) | しゃべれない / SHABERENAI (CANNOT SPEAK) |
| 話せない / HANASENAI (CANNOT SPEAK) | 秘密です / HIMITSUDESU (SECRET) |
| ⋮ | ⋮ |

(56) References Cited

U.S. PATENT DOCUMENTS

| | | | |
|---|---|---|---|
| 9,785,630 B2* | 10/2017 | Willmore | G06F 17/276 |
| 10,078,631 B2* | 9/2018 | Bellegarda | G06F 17/276 |
| 2005/0209844 A1* | 9/2005 | Wu | G06F 17/2223 |
| | | | 704/2 |
| 2007/0150257 A1* | 6/2007 | Cancedda | G06F 17/2827 |
| | | | 704/2 |
| 2009/0281789 A1* | 11/2009 | Waibel | G06F 17/2735 |
| | | | 704/3 |
| 2011/0137636 A1* | 6/2011 | Srihari | G06F 17/2863 |
| | | | 704/2 |
| 2011/0161347 A1* | 6/2011 | Johnston | G06F 16/84 |
| | | | 707/769 |
| 2014/0067728 A1* | 3/2014 | Ogren | G06F 17/2264 |
| | | | 706/12 |
| 2017/0220677 A1* | 8/2017 | Kazi | G06F 16/35 |

* cited by examiner

FIG. 2

| TO-BE-REPLACED PART | TO-BE-SUBSTITUTED CHARACTER STRING CANDIDATE |
|---|---|
| ⋮ | ⋮ |
| これだ / KOREDA (THIS) | これです / KOREDESU (THIS) |
| これだ / KOREDA (THIS) | これでございます / KOREDEGOZAIMASU (THIS) |
| ⋮ | ⋮ |
| 話せない / HANASENAI (CANNOT SPEAK) | 話せません / HANASEMASEN (CANNOT SPEAK) |
| 話せない / HANASENAI (CANNOT SPEAK) | しゃべれない / SHABERENAI (CANNOT SPEAK) |
| 話せない / HANASENAI (CANNOT SPEAK) | 秘密です / HIMITSUDESU (SECRETE) |
| ⋮ | ⋮ |

FIG. 3

| TO-BE-SUBSTITUTED CHARACTER STRING CANDIDATE | CONTEXT DEPENDENCE RATIO pc |
|---|---|
| ⋮ | ⋮ |
| です / DESU (BE) | 0.35 |
| ですが / DESUGA (BUT) | 0.05 |
| ⋮ | ⋮ |
| 話せません / HANASEMASEN (CANNOT SPEAK) | 0.25 |
| ⋮ | ⋮ |
| しゃべれない / SHABERENAI (CANNOT SPEAK) | 0.01 |
| ⋮ | ⋮ |
| 秘密です / HIMITSUDESU (SECRETE) | 0.75 |
| ⋮ | ⋮ |

FIG. 4

| LANGUAGE INFORMATION | APPEARANCE FREQUENCY |
|---|---|
| ⋮ | ⋮ |
| 英語 / EIGO (ENGLISH) | 234, 567, 890 |
| 英語 は / EIGO WA (ENGLISH) | 12, 345, 670 |
| 英語 が / EIGO GA (ENGLISH) | 22, 222, 220 |
| 英語 が 好き / EIGO GA SUKI (LIKE ENGLISH) | 999, 001 |
| ⋮ | ⋮ |

METHOD, NON-TRANSITORY
COMPUTER-READABLE RECORDING
MEDIUM STORING A PROGRAM,
APPARATUS, AND SYSTEM FOR CREATING
SIMILAR SENTENCE FROM ORIGINAL
SENTENCES TO BE TRANSLATED

BACKGROUND

1. Technical Field

The present disclosure relates to a similar sentence creating method, a non-transitory computer-readable recording medium storing a similar sentence creating program, a similar sentence creating apparatus, and a similar sentence creating system including the similar sentence creating apparatus, the method, program, apparatus, and system creating similar sentences from original sentences to be translated.

2. Description of the Related Art

Machine translation in which text in a first language is translated into a second language different from the first language has been being studied and developed in recent years. To improve performance in this type of machine translation, a translation corpus, in which many exemplary sentences available in translation are collected, is needed. Therefore, from one original sentence, one or a plurality of similar sentences (paraphrase sentences) similar to the original sentence are created.

For example, Japanese Patent No. 3932350 discloses a system for integrating language conversion processing. The system deforms a sentence by using a predetermined pattern, calculates evaluation values by using an evaluation function in order to determine whether the deformation is suitable, and selects an expression having the highest evaluation value.

Japanese Unexamined Patent Application Publication No. 2005-339043 discloses a natural language processing method in which points involved in activity are set for morphemes, the points are increased or decreased, and information is extracted from text according to the increased or decreased points.

Japanese Patent No. 5060539 discloses a document processing apparatus that creates a new post-paraphrase example on the basis of a pre-paraphrase example and a post-paraphrase example that are specified by the user, and outputs a paraphrase sentence generated by applying a difference to an analyzed sentence.

SUMMARY

Since more exemplary sentences available in translation are more preferable to improve performance in machine translation, however, further improvements have been demanded in creation of similar sentences available as exemplary sentences.

In one general aspect, the techniques disclosed here feature a method of creating similar sentences from an original sentence to be translated. The method includes: accepting a first sentence; extracting, from a first database, one or more second phrases having the same meaning as a first phrase, the first phrase being part of a plurality of phrases constituting the first sentence the first database associating phrases and synonyms of the phrases with each other; calculating an N-gram value according to a context dependence value corresponding to the one or more second phrases, the context dependence value being obtained from a second database, the second database associating phrases and context dependence values, corresponding to the phases included in the second database, with each other, the context dependence value indicating a degree to which the meaning of a phrase included in the second database depends on the context; extracting one or more contiguous third phrases that include a number of second phrases equivalent to the N-gram value from one or more second sentences obtained by replacing, in the first sentence, the first phrase with the one or more second phrases; calculating the appearance frequency of the one or more third phrases in a third database, the third database associating phases and the appearance frequencies of the phrases, in the third database, with each other; determining whether the calculated appearance frequency is larger than or equal to a threshold; and using, if the calculated appearance frequency is determined to be larger than or equal to the threshold, the one or more second sentences as similar sentences of the first sentence, and outputting the one or more second sentences to an external device.

According to the present disclosure, it is possible to reduce a cost required to search a language model database and also to identify similar sentences with high precision.

These general and specific aspects may be implemented using a system, a method, and a computer program, and any combination of systems, methods, and computer programs.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 2 illustrates an example of the structure of data in a to-be-substituted candidate dictionary illustrated in FIG. 1;

FIG. 3 illustrates an example of the structure of data in a context dependence ratio dictionary illustrated in FIG. 1;

FIG. 4 illustrates an example of the structure of data in a language model database illustrated in FIG. 1;

DETAILED DESCRIPTION

Figure 1:
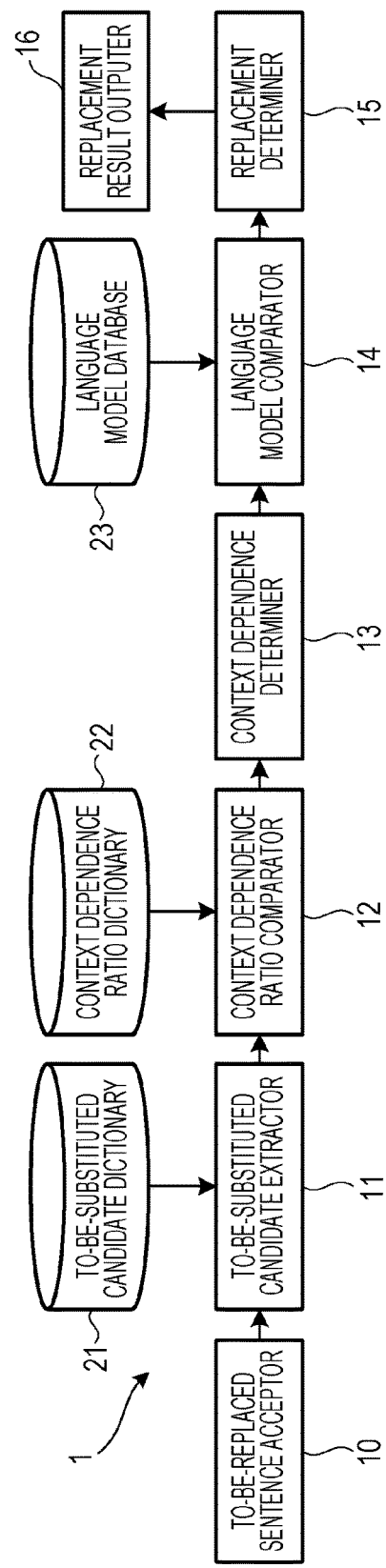
FIG. 1 is a block diagram illustrating an example of the structure of a similar sentence creating apparatus in a first embodiment of the present disclosure.

Underlying Knowledge Forming the Basis of the Present Disclosure

More exemplary sentences available in translation are more preferable to improve performance in machine translation, as described above, and the amount of documents is demanded to be automatically increased on the basis of a small amount of parallel corpus, through similar sentence creation in which clause replacement is used. When similar sentences are created by using this clause replacement, in a determination as to whether to select or discard similar sentence candidates including representations (phrases) to be substituted, whether the substitution is suitable may depend on the context.

Therefore, it is desirable to enable case studies to be learned and reflected with context dependence taken into consideration by dynamically selecting and discarding replacement rules on the basis of a language model. However, to efficiently select and discard similar sentence candidates, a method of selecting and discarding similar sentence candidates is important.

When, for example, replacement (paraphrase) is performed to expand the parallel corpus or create similar sentence candidates, if "hanasenai (cannot speak)" used as a paraphrase rule is replaced with any one of (1) "hanasemasen (cannot speak)", (2) "shaberenai (cannot speak)", and (3) "himitsudesu (secrete)", three similar sentence candidates, "eigo wa hanasemasen (cannot speak English)", "eigo wa shaberenai (cannot speak English)", and "eigo wa himitsudesu (English is secrete)" are created by applying the above paraphrase rule to the sentence "eigo wa hanasenai (cannot speak English)".

Of these similar sentence candidates, "eigo wa hanasemasen (cannot speak English)" and "eigo wa shaberenai (cannot speak English)" can be used from the context, as similar sentences. However, "eigo wa himitsudesu (English is secrete)" cannot be used as a similar sentence because it is not a proper representation in Japanese, so it is discarded. Thus, even if the same paraphrase rule is applied in this way, some similar sentence candidates may be used as similar sentences but other similar sentence candidate may not be used as similar sentences, depending on the context.

In a conventional method of identifying employed sentences, which can be used as similar sentences, and discarded sentences, which cannot be used as similar sentences, a determination has been made by using, for example, the similarity of a distributed representation model in which word vectors and sentence vectors are used or the appearance frequency of a language model (such as, for example, an N-gram language model) as a criterion. Specifically, whether to use or discard a context-depending paraphrase rule (replacement rule) has been determined by expanding a region eligible for identification (search range) of a language model (for example, enlarging the value of N in the N-gram) and making a decision as for presence as a representation.

A language model has also been used to model the fluency of sentences and make an evaluation. In an exemplary method in which an N-gram language model is used as a language model, if a representation used in a translated sentence or phrase is included more often in an N-gram language model database, the score of the translated sentence or phrase is increased, and if the representation is included less often, the score is lowered. By applying this method, the score of a similar sentence candidate has been calculated and the similar sentence candidate has been identified as a good sentence (employed sentence, which can be used as a similar sentence) or a bad sentence (discarded sentence, which cannot be used as a similar sentence).

However, if the region eligible for identification is expanded, the amount of data and the amount of calculation are increased and a data distribution becomes sparse. Therefore, when the large region eligible for identification is searched for all to-be-substituted candidates, the amount of data and the amount of calculation are increased. For example, a 2-gram involves about 80 million entries, but a 5-gram involves about 800 million entries. This indicates the problem that when the value of N of an N-gram is increased, the amount of data and the amount of calculation are greatly increased.

To solve the above problem, in the present disclosure, a context dependence value storer, for example, is provided that stores a plurality of correspondences between to-be-substituted character string candidates and context dependence values, each of which represents a degree to which the relevant to-be-substituted character string candidate depends on the context. Then, for a similar sentence that results in a good or bad replacement depending on the context, whether to reference to a language model including words before and after the to-be-substituted character string candidate is determined according to whether the replacement becomes good or bad depending on the context.

That is, a search range (region eligible for identification) in a language model database is determined according to the context dependence value, and the language model database is searched in the determined search range so that only to-be-substituted character string candidates regarded as having a high context dependence value are identified in a larger search region and to-be-substituted character string candidates regarded as having a low context dependence value are identified in a small search region. This assures a balance between a search cost and precision in identification.

In the conventional method of creating similar sentences, distributed representations and representations that are not included in language models cannot be originally identified and are thereby discarded. If, for example, there is no sentence including the phrase "sore wa himitsudesu (it is secrete)" in training data, similar sentence candidates including "sore wa himitsudesu (it is secrete)" cannot be identified and are thereby discarded.

To solve the above problem, in the present disclosure, if, for example, a to-be-substituted character string candidate having context dependence is input as an external input (such as, for example, a feedback from the user or from a predetermined device), the language model database, context dependence value storer, and the like are updated. If a new sentence representation is input, the context dependence value of the relevant word in the context dependence value storer is changed according to the representation. An N-gram including the new sentence representation and the like are also partially structured and the new sentence representation is reflected in the language model. Thus, the appearance frequency and the like of the language model including words before and after the to-be-substituted character string candidate are adjusted by adding correct data, and the context dependence value storer itself is updated according to the external input.

As described above, when a language model database and other databases are updated by feeding back external knowledge or new knowledge, precision in identification can be improved. As a result, good similar sentence candidates can be identified at a low cost. In addition, even for a representation not present in an N-gram model database, similar sentence candidates can be autonomously identified at a high efficiency by updating the database.

After diligent study of a method of creating similar sentences from an original sentence on the basis of the above underlying knowledge, the inventors of this application has completed the present disclosure.

(1) A method in an aspect of the present disclosure is a method of creating similar sentences from an original sentence to be translated. The method includes: accepting a first sentence; extracting, from a first database, one or more second phrases having the same meaning as a first phrase, the first phrase being part of a plurality of phrases constituting the first sentence the first database associating phrases and synonyms of the phrases with each other; calculating an N-gram value according to a context dependence value corresponding to the one or more second phrases, the context dependence value being obtained from a second database, the second database associating phrases and context dependence values, corresponding to the phases included in the second database, with each other, the context dependence value indicating a degree to which the meaning of a phrase included in the second database depends on the context; extracting one or more contiguous third phrases that include a number of second phrases equivalent to the N-gram value from one or more second sentences obtained by replacing, in the first sentence, the first phrase with the one or more second phrases; calculating the appearance frequency of the one or more third phrases in a third database, the third database associating phases and the appearance frequencies of the phrases, in the third database, with each other; determining whether the calculated appearance frequency is larger than or equal to a threshold; and using, if the calculated appearance frequency is determined to be larger than or equal to the threshold, the one or more second sentences as similar sentences of the first sentence, and outputting the one or more second sentences to an external device.

In this structure, a first sentence is accepted; one or more second phrases having the same meaning as a first phrase, the first phrase being part of a plurality of phrases constituting the first sentence, are extracted from a first database, the first database associating phrases and synonyms of the phrases, included in the first database, with each other; an N-gram value is calculated according to a context dependence value corresponding to the one or more second phrases, the context dependence value being obtained from a second database, the second database associating phrases and context dependence values, corresponding to the phases included in the second database, with each other, the context dependence value indicating a degree to which the meaning of a phrase included in the second database depends on the context; one or more contiguous third phrases that include a number of second phrases equivalent to the N-gram value are extracted from one or more second sentences obtained by replacing, in the first sentence, the first phrase with the one or more second phrases; the appearance frequency of the one or more third phrases in a third database is calculated, the third database associating phases and the appearance frequencies of the phrases, included in the third database, in the third database with each other; whether the calculated appearance frequency is larger than or equal to a threshold is determined; and if the calculated appearance frequency is determined to be larger than or equal to the threshold, the one or more second sentences are used as similar sentences of the first sentence and are output to an external device. Therefore, only a second phrase with a high context dependence ratio can be identified in a large search region, and a second phrase with a low context dependence ratio can be identified in a small search region, so it is possible to reduce a cost required to search the third database, which is a language model database and also to identify similar sentences with high precision.

(2) In the above aspect, the first sentence may be written in a first language; the first sentence may be included in a parallel corpus, the parallel corpus including a plurality of pairs, each of which is composed of a sentence written in the first language and a translated sentence written in a second language; and if the calculated appearance frequency is determined to be larger than or equal to the threshold, the one or more second sentences may be added to the parallel corpus as similar sentences of the first sentence.

In this structure, similar sentences can be added to the parallel corpus.

(3) In the above aspect, the third database may include an N-gram language model database; i (positive integer) may be determined as N of the N-gram language model according to the context dependence value; the third database may be referenced to obtain the appearance frequency of the N-gram including the second phrase; and whether to use the one or more second sentences as similar sentences of the first sentence may be determined according to the appearance frequency of the N-gram including the second phrase.

In this structure, i (positive integer) is determined as N of the N-gram language model according to the context dependence value, the N-gram language model database is referenced to obtain the appearance frequency of the N-gram including the second phrase, and whether to use the one or more second sentences as similar sentences of the first sentence is determined according to the obtained appearance frequency. Therefore, when the value of i is set so that the larger the context dependence ratio is, the larger value i takes and that the smaller the context dependence ratio is, the smaller value i takes, it is possible to highly precisely obtain the appearance frequency of an N-gram including a second phrase with a high context dependence ratio by using a wide region eligible for identification for the second phrase with high context dependence, and to highly precisely obtain the appearance frequency of an N-gram including a second phrase with a low context dependence ratio at a low cost by using a narrow region eligible for identification for the second phrase with low context dependence. Accordingly, similar sentences can be to be highly precisely identified at a high efficiency.

(4) In the above aspect, a translation result sentence may be created by translating a predetermined to-be-translated sentence by the use of a translation model created from the one or more second sentences determined to be used as similar sentences of the first sentence and from a translated sentence resulting from the translation of the first sentence, from which the one or more second sentences have been created, in a second language; the translation result sentence may be evaluated; and feedback information may be created according to an evaluation result for the translation result sentence, the feedback information including language information related to at least one of the language of the to-be-translated sentence and the language of the translation result sentence as well as evaluation information for the language information.

In this structure, a translation result sentence is created by translating a predetermined to-be-translated sentence by the use of a translation model created from the one or more second sentences determined to be used and from a translated sentence resulting from the translation of the first sentence, from which the one or more second sentences have been created, in a second language; the created translation result sentence is evaluated; and feedback information is created according to an evaluation result for the translation result sentence, the feedback information including language information related to at least one of the language of the to-be-translated sentence and the language of the translation result sentence as well as evaluation information for the language information. Therefore, it is possible to autonomously create feedback information used to learn and reflect examples for which context dependence is taken into consideration.

(5) In the above aspect, at least one of the first database, second database, and third database may be updated with the feedback information.

In this structure, at least one of the first database, second database, and third database may be updated with the feedback information, which includes the language information and evaluation information. Therefore, it is possible to reflect examples for which context dependence is taken into consideration in at least one of the first database, second database, and third database and thereby to autonomously identify similar sentences at a high efficiency even if a representation not present in any of the first database, second database, and third database before they are updated is used.

(6) In the above aspect, if the feedback information includes the second phrase with context dependence, the second database and third database may be updated.

In this structure, if the feedback information includes the second phrase with context dependence, the second database and third database are updated. Therefore, it is possible to reflect examples for which context dependence is taken into consideration in the second database and third database and thereby to autonomously identify similar sentences at a high efficiency with context dependence taken into consideration.

(7) In the above aspect, if the feedback information includes a new sentence representation, a context dependence value in the second database may be changed according to the new sentence representation.

In this structure, if the feedback information includes a new sentence representation, a context dependence value in the second database is changed according to the new sentence representation. Therefore, it is possible to autonomously identify similar sentences at a high efficiency even if a new representation is used.

(8) In the above aspect, if the feedback information includes a new sentence representation, the third database may be updated so as to include the new sentence representation.

In this structure, if the feedback information includes a new sentence representation, the third database is updated so as to include the new sentence representation. Therefore, it is possible to autonomously identify similar sentences at a high efficiency even if a new representation not present in the third database before it is updated is used.

The present disclosure can be implemented not only as a similar sentence creating method by which characteristic processing as described above is executed but also as a computer program that causes a computer to execute this characteristic processing included in the similar sentence creating method. The present disclosure can also be implemented as a similar sentence creating apparatus or the like that has a characteristic structure that deals with the characteristic processing executed by the similar sentence creating method. Therefore, in other aspects described below as well, effects similar to those provided by the above similar sentence creating method can be obtained.

(9) A non-transitory computer-readable recording medium storing a program in another aspect of the present disclosure causes a computer to function as an apparatus that creates similar sentences from an original sentence to be translated. The program causes the computer to execute processing to: accept a first sentence; extract, from a first database, one or more second phrases having the same meaning as a first phrase, the first phrase being part of a plurality of phrases constituting the first sentence the first database associating phrases and synonyms of the phrases, with each other; calculate an N-gram value according to a context dependence value corresponding to the one or more second phrases, the context dependence value being obtained from a second database, the second database associating phrases and context dependence values, corresponding to the phases included in the second database, with each other, the context dependence value indicating a degree to which the meaning of a phrase included in the second database depends on the context; extract one or more contiguous third phrases that include a number of second phrases equivalent to the N-gram value from one or more second sentences obtained by replacing, in the first sentence, the first phrase with the one or more second phrases; calculate the appearance frequency of the one or more third phrases in a third database, the third database associating phases and the appearance frequencies of the phrases, in the third database, database with each other; determine whether the calculated appearance frequency is larger than or equal to a threshold; and use, if the calculated appearance frequency is determined to be larger than or equal to the threshold, the one or more second sentences as similar sentences of the first sentence, and output the one or more second sentences to an external device.

(10) An apparatus in another aspect of the present disclosure creates similar sentences from an original sentence to be translated. The apparatus includes: an acceptor that accepts a first sentence; a second phrase extractor that extracts one or more second phrases having the same meaning as a first phrase, the first phrase being part of a plurality of phrases constituting the first sentence, from a first database, the first database associating phrases and synonyms of the phrases with each other; a calculator that calculates an N-gram value according to a context dependence value corresponding to the one or more second phrases, the context dependence value being obtained from a second database, the second database associating phrases and context dependence values, corresponding to the phases included in the second database, with each other, the context dependence value indicating a degree to which the meaning of a phrase included in the second database depends on the context; a third phrase extractor that extracts one or more contiguous third phrases that include a number of second phrases equivalent to the N-gram value from one or more second sentences obtained by replacing, in the first sentence, the first phrase with the one or more second phrases; a calculator that calculates the appearance frequency of the one or more third phrases in a third database, the third database associating phases and the appearance frequencies of the phrases, in the third database, with each other; a determiner that determines whether the calculated appearance frequency is larger than or equal to a threshold; and an outputer that, if the calculated appearance frequency is determined to be larger than or equal to the threshold, uses the one or more second sentences as similar sentences of the first sentence, and outputs the one or more second sentences to an external device.

(11) A system in another aspect of the present disclosure creates similar sentences from an original sentence to be translated. The system includes: the apparatus described above; a translator that creates a translation result sentence by translating a predetermined to-be-translated sentence by the use of a translation model created from the one or more second sentences that the device has determined to use as similar sentences of the first sentence and from a translated sentence resulting from the translation of the first sentence, from which the one or more second sentences have been created, in a second language; an evaluator that evaluates the translation result sentence created by the translator; and a creator that creates feedback information including language information related to at least one of the language of the to-be-translated sentence and the language of the translation result sentence as well as evaluation information for the language information, according to an evaluation result from the evaluator.

In this structure, it is possible to obtain effects similar to those provided by the similar sentence creating method described above. Furthermore, since a translation result sentence is created by translating a predetermined to-be-translated sentence by using a translation model created from one or more second sentences determined to be used as similar sentences of a first sentence and from a translated sentence resulting from the translation of the first sentence, from which the one or more second sentences have been created, in a second language, the created translation result sentence is evaluated, and feedback information is created according to an evaluation result for the translation result sentence, the feedback information including language information related to at least one of the language of the to-be-translated sentence and the language of the translation result sentence as well as evaluation information for the language information, it is possible to implement a system that can autonomously create feedback information used to learn and reflect examples for which context dependence is taken into consideration and can thereby autonomously learn and reflect examples for which context dependence is taken into consideration.

It will be appreciated that a computer program as described above can be distributed as a computer-readable non-transitory recording medium such as a compact disc-read-only memory (CD-ROM) or through a communication network such as the Internet.

A system may be structured in which part of the constituent elements of the similar sentence creating apparatus or similar sentence creating system in an embodiment of the present disclosure and the remaining constituents are distributed in a plurality of computers.

Embodiments described below are just specific examples of the present disclosure. Numerals, shapes, constituent elements, steps, the sequence of these steps, and the like indicated in the embodiments below are just examples, and are not intended to restrict the present disclosure. Of the constituent elements in the embodiments below, constituent elements not described in independent claims, each of which indicates the topmost concept of the present disclosure, will be described as arbitrary constituent elements. Contents in all embodiments may be combined.

The embodiments of the present disclosure will be described below with reference to the drawings.

First Embodiment

FIG. 1 is a block diagram illustrating an example of the structure of a similar sentence creating apparatus in a first embodiment of the present disclosure. The similar sentence creating apparatus 1 illustrated in FIG. 1 creates similar sentences from a sentence to be replaced (original sentence). The similar sentence creating apparatus 1 includes a to-be-replaced sentence acceptor 10, a to-be-substituted candidate extractor 11, a context dependence ratio comparator 12, a context dependence determiner 13, a language model comparator 14, a replacement determiner 15, a replacement result outputer 16, a to-be-substituted candidate dictionary 21, a context dependence ratio dictionary 22, and a language model database 23.

The to-be-replaced sentence acceptor 10, which accepts a certain manipulation input made by the user, accepts a to-be-replaced sentence (first sentence) entered by the user and outputs the to-be-replaced sentence to the to-be-substituted candidate extractor 11. For example, the to-be-replaced sentence "Boku wa eigo ga hanasenai node nihongo de onegaishimasu (I cannot speak English, so please speak in Japanese)" is input to the to-be-replaced sentence acceptor 10. The language of similar sentences created by the similar sentence creating apparatus 1 is not particularly limited to Japanese; these similar sentences may be in English, Chinese, Korean, French, German, Italian, Portuguese, and any other languages.

The to-be-substituted candidate dictionary 21 is a to-be-substituted candidate storer that stores examples of clauses, words, morphemes and the like to be replaced as a dictionary. Specifically, the to-be-substituted candidate dictionary 21 prestores one or a plurality of to-be-substituted character string candidates that are candidates to be substituted for a part to be replaced, the part being included in a sentence to be replaced. The to-be-substituted candidate dictionary 21 is an example of a first database that associates phrases and synonyms of the phrases, included in the to-be-substituted candidate dictionary 21, with each other.

FIG. 2 illustrates an example of the structure of data in the to-be-substituted candidate dictionary 21 illustrated in FIG. 1. As illustrated in FIG. 2, the to-be-substituted candidate dictionary 21 prestores parts (phrases) to be replaced and to-be-substituted character string candidates (synonyms of the phrases) in correspondence to each other. For example, to-be-substituted character string candidates such as "kore-desu (this)" and "koredegozaimasu (this)" are prestored in correspondence to "koreda (this)" used as a to-be-replaced part. As another example, to-be-substituted character string candidates such as "hanasemasen (cannot speak)", "shaberenai (cannot speak)", and "himitsudesu (secrete)" are prestored in correspondence to "hanasenai (cannot speak)" used as a to-be-replaced part.

From the to-be-substituted candidate dictionary 21, the to-be-substituted candidate extractor 11 extracts to-be-substituted character string candidates (one or more second phrases) that have the same meaning as the to-be-replaced part (first phrase), which is part of a plurality of phrases constituting a to-be-replaced sentence (first sentence). Specifically, the to-be-substituted candidate extractor 11 divides a to-be-replaced sentence entered from the to-be-replaced sentence acceptor 10 into clauses, words, morphemes, and the like, determines a to-be-replaced part from the divided clauses, words, morphemes, and the like, searches the to-be-substituted candidate dictionary 21 for character string pairs (to-be-substituted character string candidates) that can be substituted, the character string pairs being stored in correspondence to the to-be-replaced part, extracts one or a plurality of to-be-substituted character string candidates, and outputs them to the context dependence ratio comparator 12 together with the to-be-replaced sentence. If the to-be-replaced part is, for example, "hanasenai (cannot speak)", the to-be-substituted candidate extractor 11 extracts to-be-substituted character string candidates such as "hanasemasen (cannot speak)", "shaberenai (cannot speak)", and "himitsudesu (secrete)" from the to-be-substituted candidate dictionary 21. The method of dividing a to-be-replaced sentence is not particularly limited to the above example; various known methods can be used.

The context dependence ratio dictionary 22 is a context dependence value storer that stores context dependence values, each of which indicates applicability (context dependence) in replacement with a cause, word, morpheme, or the like, as a dictionary in which each context dependence value is paired with a numeral and a clause, word, morpheme, or the like. Specifically, the context dependence ratio dictionary 22 prestores a plurality of data pairs, in each of which a to-be-substituted character string candidate and a context dependence ratio pc, which represents a degree to which the to-be-substituted character string candidate depends on the context, are associated with each other. The context dependence ratio dictionary 22 is an example of a second database that associates phrases and context dependence values corresponding to the phrases, included in the context dependence ratio dictionary 22, with each other. The context dependence value indicates a degree to which the meaning of the phrase included in the context dependence ratio dictionary 22 depends on the context.

FIG. 3 illustrates an example of the structure of data in the context dependence ratio dictionary 22 illustrated in FIG. 1. As illustrated in FIG. 3, the context dependence ratio dictionary 22 prestores, for example, a pc of 0.35 for the to-be-substituted character string candidate "desu (be)" a pc of 0.05 for "desuga (but)", a pc of 0.25 for "hanasemasen (cannot speak)" a pc of 0.01 for "shaberenai (cannot speak)", and a pc of 0.75 for "himitsudesu (secrete)".

The context dependence ratio pc is, for example, a value that represents, in the range of 0 to 1, the probability that a similar sentence candidate using a to-be-substituted character string candidate is discarded due to the dependence of the to-be-substituted character string candidate on the context. The context dependence value is not particularly limited to the above context dependence ratio pc; various modifications are possible. Another value representing a degree to which the to-be-substituted character string candidate depends on the context may be used. Alternatively, a degree to which the to-be-substituted character string candidate depends on the context may be classified (for example, the degree of context dependence may be divided into large, medium, small, and other classes), and the class to which the degree belongs may be stored.

The context dependence ratio comparator 12 searches the context dependence ratio dictionary 22 for the context dependence ratio pc of a to-be-substituted character string candidate, extracts the context dependence ratio pc stored in correspondence to the to-be-substituted character string candidate, and outputs the extracted context dependence ratio pc to the context dependence determiner 13 together with a to-be-replaced sentence. For example, if the to-be-substituted character string candidate is "hanasemasen (cannot speak)", 0.25 is extracted as the context dependence ratio pc; if the to-be-substituted character string candidate is "shaberenai (cannot speak)", 0.01 is extracted; and if the to-be-substituted character string candidate is "himitsudesu (secrete)", 0.75 is extracted.

The context dependence determiner 13 calculates N-gram values according to the context dependence values corresponding to the to-be-substituted character string candidates (one or more second phrases), the context dependence values being obtained from the context dependence ratio dictionary 22. Specifically, according to the context dependence ratio pc, the context dependence determiner 13 makes a determination for a region eligible for identification in the language model database 23, the region being referenced to make determinations for similar sentence candidates including to-be-substituted character string candidates, and outputs the determination result to the language model comparator 14 together with the to-be-replaced sentence.

In this embodiment, an N-gram language model database is used as the language model database 23, and data is prestored in the language model database 23 in tabular form so that language information and its appearance frequency are associated with each other. The language model database 23 is an example of a third database in which phrases and frequencies at which the phrases included in the language model database 23 appear in the language model database 23 are associated with each other.

FIG. 4 illustrates an example of the structure of data in the language model database 23 illustrated in FIG. 1. For example, as illustrated in FIG. 4, the language model database 23 prestores "234, 567, 890" for "eigo (English)", "12, 345, 670" for "eigo wa (English)", "22, 222, 220" for "eigo ga (English)", and "999, 001" for "eigo ga suki (like English)" as the language information and its appearance frequency respectively, in tabular form so as to be associated with each other. Appearance probability for example, can be obtained from the appearance frequency.

Information stored in the language model database 23 is not particularly limited to the above example. If information to be stored in the language model database 23 is in a tabular form in which language information and values corresponding to its appearance frequency or the like are associated with each other, the information may include any contents. The language model in the language model database 23 is not particularly limited to the above N-gram language model; any other language models may be used.

If the language model database 23 is an N-gram language model database, the context dependence determiner 13 determines i (positive integer) as N (N-gram value) of the N-gram language model in the language model database 23, according to the context dependence ratio pc. Specifically, the context dependence determiner 13 divides context dependence ratios pc into, for example, four classes. If the context dependence ratio pc is larger than or equal to 0 and smaller than or equal to 0.25, it is categorized as a first class; if the context dependence ratio pc is larger than 0.25 and smaller than or equal to 0.5, it is categorized as a second class; if the context dependence ratio pc is larger than 0.5 and smaller than or equal to 0.75, it is categorized as a third class; and if the context dependence ratio pc is larger than 0.75 and smaller than or equal to 1, it is categorized as a fourth class. N (positive integer) in the N-gram is determined as 4 in the first class, 5 in the second class, 6 in the third class, and 7 in the fourth class.

If, for example, the to-be-substituted character string candidate is "hanasemasen (cannot speak)", the context dependence ratio pc is 0.25, so the context dependence ratio pc belongs to the first class. Then, the context dependence determiner 13 determines an N-gram equivalent to the first class as the region eligible for identification in the language model database 23, that is, determines 4 as N. The criterion according to which the region eligible for identification is determined is not particularly limited to the above example; various modifications are possible. The region eligible for identification may be determined directly from a mathematical expression by using the context dependence ratio pc. For example, if N is floor (k−log 2 (pc)) (k is a constant), when the to-be-substituted character string candidate is "hanasemasen (cannot speak)", the context dependence ratio pc is 0.25. If the constant k is 6, N becomes 4.

The language model database 23 is not limited to N-gram language models. The language model database 23 may be a database based on any other language resource. For example, language models in the language model database 23 may be written in distributed representations in which real number values and vectors are used. The language model database 23 can be structured by combining any existing methods and existing data. In any case, any variable can be used to define a range in which the database is searched for a region eligible for identification and the any variable can be determined according to the context dependence ratio pc.

The language model comparator 14 extracts contiguous N-grams (one or more third phrases) that include a number of to-be-substituted character string candidates (second phrases) equivalent to the N-gram value from substituted sentences (one or more second sentences) obtained by replacing, in a to-be-replaced sentence (first sentence), a to-be-replaced part (first phrase) with to-be-substituted character string candidates (one or more second phrases), after which the language model comparator 14 calculates the appearance frequencies of the N-grams (one or more third phrases) in the language model database 23.

That is, the language model comparator 14 searches the language model database 23 for data eligible for identification, the data corresponding to the area eligible for identification, the area having been determined by the context dependence determiner 13, and extracts the data, after which the language model comparator 14 makes a comparison with a to-be-substituted character string candidate, creates paired data composed of language information including clauses, words, morpheme, and the like related to the to-be-substituted character string candidate and values corresponding to the appearance frequency or appearance probability of the language information, and outputs the paired data to the replacement determiner 15 together with the to-be-replaced sentence.

Specifically, the language model comparator 14 acquires the appearance frequency or appearance probability of an N-gram (which is, for example, a 4-gram when the to-be-substituted character string candidate belongs to the first class) from the language model database 23 by using the value of N given as the size of a region eligible for identification, the region being referenced by the context dependence determiner 13, and outputs the compared to-be-substituted character string candidate and the acquired appearance frequency or appearance probability to the replacement determiner 15.

The replacement determiner 15 determines whether to apply the to-be-substituted character string candidate to the to-be-replaced sentence or discard the to-be-substituted character string candidate, by using paired data composed of language information including clauses, words, morpheme, and the like and the value corresponding to the appearance frequency or appearance probability of the language information, the paired data having been obtained from the language model comparator 14, after which the replacement determiner 15 outputs the replacement result to the replacement result outputer 16 together with the to-be-replaced sentence.

As an example of the above determination method, the replacement determiner 15 determines whether the calculated appearance frequency is larger than or equal to a threshold. Specifically, when the value of the appearance frequency of j-th language information (j is an arbitrary integer) is nj and a predetermined threshold is Th, if nj is larger than Th for all values of j, the replacement determiner 15 determines that the to-be-substituted character string candidate is to be applied to the to-be-replaced sentence. In any other cases, the replacement determiner 15 determines that the to-be-substituted character string candidate is to be discarded.

For example, if a 4-gram is used as an N-gram, then the following language information and its appearance frequency are respectively obtained for the to-be-substituted character string candidate "hanasemasen (cannot speak)": "wa eigo ga hanasemasen (cannot speak English)" and "51, 550", "eigo ga hanasemansen node (because of inability to speak English)" and "1, 720", "ga hanasemansen node nihon (Japan because of inability to speak)" and "530", and "hanasemansen node nihon go (Japanese because of inability to speak)" and "3, 220". When Th is 500, the appearance frequency is larger than or equal to the threshold Th for all values of j, 1 to 4, so the to-be-substituted character string candidate "hanasemasen (cannot speak)" is determined to be applicable.

The method of determining whether to apply the to-be-substituted character string candidate to the to-be-replaced sentence or discard the to-be-substituted character string candidate is not particularly limited to the above example; various modifications are possible. Whether to apply or discard the to-be-substituted character string candidate may be determined according to the distribution of nj (for example, the lower 3 percent of the appearance frequency of the 4-gram may be discarded). Alternatively, whether to apply or discard the to-be-substituted character string candidate may be determined according to whether or not j that causes nj to be 0 is preset. Alternatively, whether to apply or discard the to-be-substituted character string candidate may be determined according to a value calculated from an arbitrary equation in which nj is used.

If the calculated appearance frequency is determined to be larger than or equal to the threshold, the replacement result outputer 16 uses substituted sentences (one or more second sentences) created from the to-be-substituted character string candidate determined to be applicable as similar sentences of the to-be-replaced sentence (first sentence), and outputs the similar sentences to an external device. Specifically, the replacement result outputer 16 replaces the to-be-replaced part of the to-be-replaced sentence with the to-be-substituted character string candidate that the replacement determiner 15 has determined to be applicable, according to the replacement result, after which the replacement result outputer 16 uses the substituted sentences (sentences after the replacement) created from the to-be-substituted character string candidate determined to be applicable, and outputs the created similar sentences to an external device (not illustrated) or the like.

The to-be-replaced sentence (first sentence) is written in a first language (Japanese, for example). The to-be-replaced sentence (first sentence) is included in a parallel corpus. The parallel corpus includes a plurality of pairs, each of which is composed of a sentence written in the first language and a translated sentence written in a second language (English, for example). If the calculated appearance frequency is determined to be larger than or equal to the threshold, the replacement result outputer 16 may add, to the parallel corpus, the substituted sentences (one or more second sentences) created from the to-be-substituted character string candidate determined to be applicable, as similar sentences of the to-be-replaced sentence (first sentence).

The structure of the similar sentence creating apparatus 1 is not particularly limited to an example in which the similar sentence creating apparatus 1 is structured with special hardware for each function as described above. The similar sentence creating apparatus 1 may be structured so that one or a plurality of computers or servers (information processing apparatuses) that each include a central processing unit (CPU), a read-only memory (ROM), a random-access memory (RAM), an auxiliary storage unit, and the like install similar sentence creating programs used to execute the above processing and function as a similar sentence creating apparatus. The to-be-substituted candidate dictionary 21, context dependence ratio dictionary 22, and language model database 23 are not particularly limited to an example in which they are provided in the similar sentence creating apparatus 1. The to-be-substituted candidate dictionary 21, context dependence ratio dictionary 22, and language model database 23 may be provided in an external server or the like, and the similar sentence creating apparatus 1 may acquire necessary information from them through a predetermined network. This is also true in other embodiments.

Figure 5:
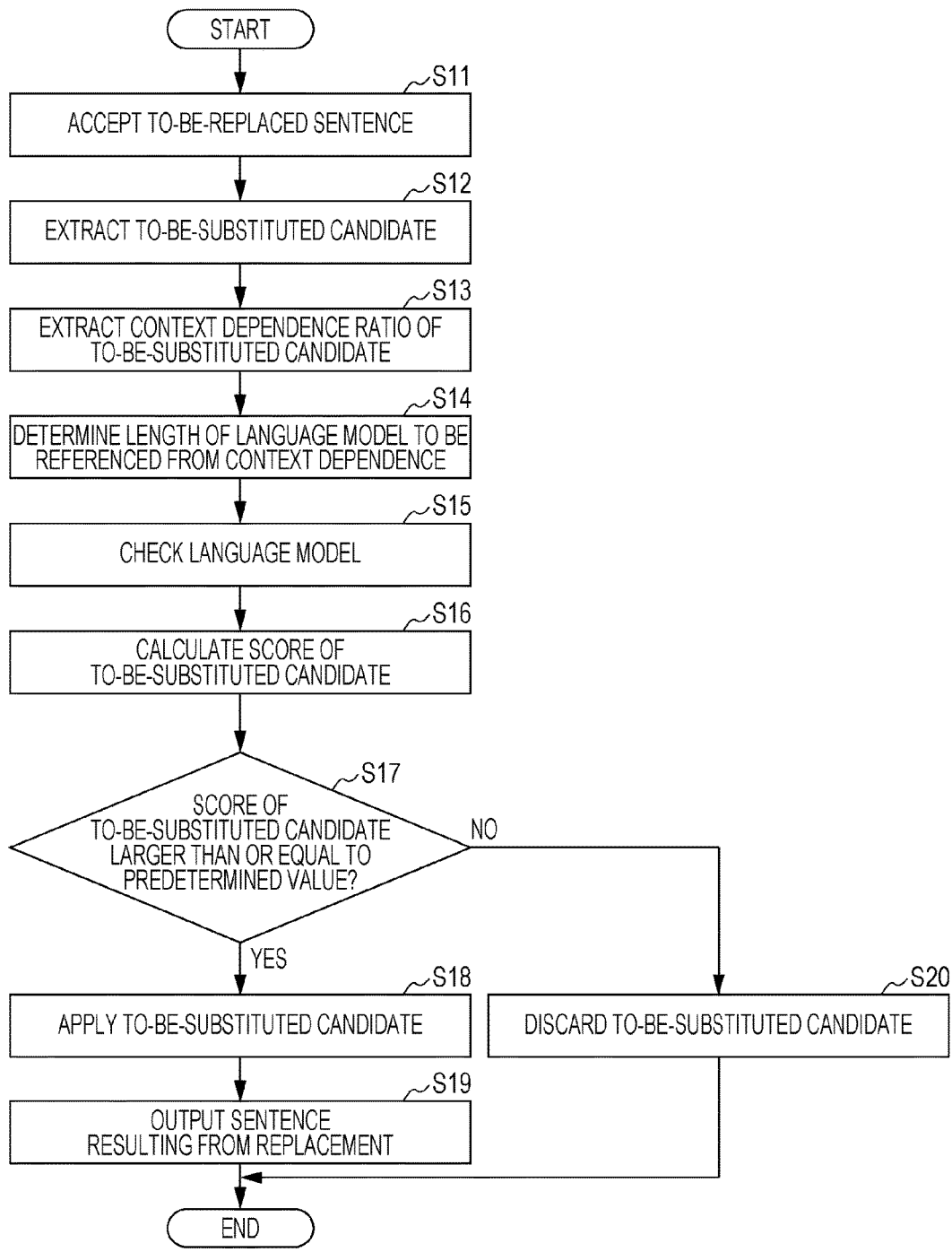
FIG. 5 is a flowchart illustrating an example of similar sentence creation processing performed by the similar sentence creating apparatus illustrated in FIG. 1.

Next, similar sentence creation processing performed by the similar sentence creating apparatus 1 structured as described above will be described in detail. FIG. 5 is a flowchart illustrating an example of similar sentence creation processing performed by the similar sentence creating apparatus 1 illustrated in FIG. 1. Although, in processing described below, an appearance frequency is used to determine whether to apply or discard a to-be-substituted character string candidate, this example is not a particular limitation. For example, an appearance probability or the like may be used. This is also true in other embodiments.

First, in step S11, the to-be-replaced sentence acceptor 10 accepts a to-be-replaced sentence (original sentence) entered by the user, and outputs the accepted to-be-replaced sentence to the to-be-substituted candidate extractor 11.

Next, in step S12, the to-be-substituted candidate extractor 11 divides the to-be-replaced sentence into clauses, words, morphemes, and the like, determines a to-be-replaced part from the divided clauses, words, morphemes, and the like, extracts a to-be-substituted character string candidate stored in the to-be-substituted candidate dictionary 21 in correspondence to the to-be-replaced part, and outputs the extracted to-be-substituted character string candidate to the context dependence ratio comparator 12 together with the to-be-replaced sentence.

Next, in step S13, the context dependence ratio comparator 12 references the context dependence ratio dictionary 22, extracts the context dependence ratio pc of the to-be-substituted character string candidate, and outputs the extracted context dependence ratio pc to the context dependence determiner 13 together with the to-be-replaced sentence.

Next, in step S14, the context dependence determiner 13 determines N of the N-gram of the language model database 23 from the value of the context dependence ratio pc of the to-be-substituted character string candidate to determine the length of the language model to be referenced from context dependence, and outputs the determined value of N to the language model comparator 14 together with the to-be-replaced sentence.

If, for example, the to-be-replaced sentence is "Boku wa eigo ga hanasenai node nihongo de onegaishimasu (I cannot speak English, so please speak in Japanese)", the to-be-substituted character string candidate is "hanasemasen (cannot speak)", and the to-be-replaced sentence candidate is "Boku wa eigo ga hanasemasen node nihongo de onegaishimasu (I cannot speak English, so please speak in Japanese)", the context dependence determiner 13 determines 4 as the value of N of the N-gram in the language model database 23.

Next, in step S15, the language model comparator 14 acquires the appearance frequency of the N-gram from the language model database 23 by using the value of N given as the size of the region eligible for identification, the region being referenced by the context dependence determiner 13, and outputs the compared to-be-substituted character string candidate and acquired appearance frequency to the replacement determiner 15 together with the to-be-replaced sentence.

In the case in which, for example, "hanasenai (cannot speak)" in the above to-be-replaced sentence is replaced with "hanasemasen (cannot speak)", the language model comparator 14 creates 4-grams, around "hanasenai (cannot speak)", that include the replaced clause "hanasenai (cannot speak)" (for example, "wa eigo ga hanasemasen (cannot speak English)", "eigo ga hanasemansen node (because of inability to speak English)", "ga hanasemansen node nihon (Japan because of inability to speak)", and "hanasemansen node nihon go (Japanese because of inability to speak)", after which the language model comparator 14 compares them with the language model database 23 and acquires the appearance frequency of each 4-gram (for example, "51, 550" for "wa eigo ga hanasemasen (cannot speak English)" and, "1, 720" for "eigo ga hanasemansen node (because of inability to speak English)", 530 for "ga hanasemansen node nihon (Japan because of inability to speak)", and "3, 220" for "hanasemansen node nihon go (Japanese because of inability to speak)".

Next, in step S16, the replacement determiner 15 acquires an N-gram including the to-be-substituted character string candidate and its appearance frequency from the language model comparator 14, and calculates the score of the to-be-substituted character string candidate.

Next, in step S17, the replacement determiner 15 determines whether the score (appearance frequency) of the to-be-substituted character string candidate is larger than or equal to the predetermined threshold Th to determine whether to apply the to-be-substituted character string candidate to the to-be-replaced sentence or discard the to-be-substituted character string candidate, and outputs the result of the determination as to whether to apply or discard the to-be-substituted character string candidate to the replacement result outputer 16 together with the to-be-replaced sentence.

If the replacement determiner 15 determines in step S17 that the score (appearance frequency) of the to-be-substituted character string candidate is smaller than the predetermined threshold Th, the replacement result outputer 16 discards the to-be-substituted character string candidate in step S20, terminating the processing.

If the replacement determiner 15 determines in step S17 that the score (appearance frequency) of the to-be-substituted character string candidate is larger than or equal to the predetermined threshold Th, the replacement result outputer 16 applies the to-be-substituted character string candidate to the to-be-replaced part of the to-be-replaced sentence in step S18 to create a substituted sentence in which the to-be-replaced part of the to-be-replaced sentence has been replaced with the to-be-substituted character string candidate.

Next, in step S19, the replacement result outputer 16 outputs, as a similar sentence, a substituted sentence created from the to-be-substituted character string candidate that has been determined to be applicable, terminating the processing.

In this embodiment, the above processing is performed to determine the value of N of an N-gram language model according to the context dependence ratio pc; the value of N is set so that the larger the context dependence ratio pc is, the larger value N takes, and the smaller the context dependence ratio pc is, the smaller value N takes. The language model database 23 is referenced by using the determined value of N to obtain the appearance frequency of the N-gram including the to-be-substituted character string candidate, and whether to use the substituted sentence created by using the to-be-substituted character string candidate as a similar sentence is determined according to the obtained appearance frequency. Therefore, it is possible to highly precisely obtain the appearance frequency of an N-gram including a to-be-substituted character string candidate with a high context dependence ratio pc by using a wide region eligible for identification, and it is also possible to highly precisely obtain the appearance frequency of an N-gram including a to-be-substituted character string candidate with a low context dependence ratio pc at a low cost by using a narrow region eligible for identification. As a result, it is possible to reduce a cost required to search the language model database 23 and also to identify similar sentences with high precision.

Second Embodiment

Figure 6:
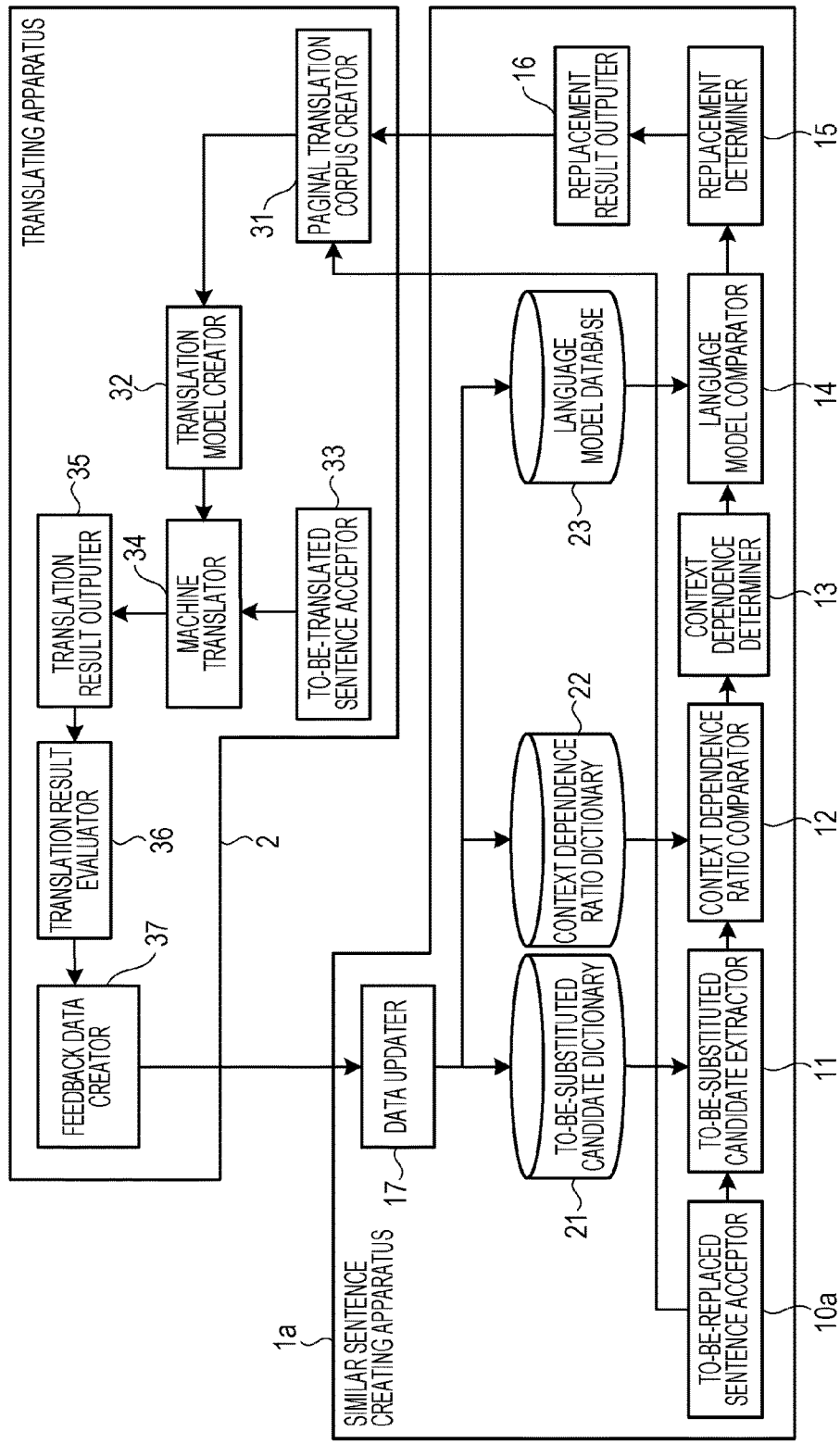
FIG. 6 is a block diagram illustrating an example of the structure of a similar sentence creating system in a second embodiment of the present disclosure.

FIG. 6 is a block diagram illustrating an example of the structure of a similar sentence creating system in a second embodiment of the present disclosure. The similar sentence creating system in FIG. 6 includes a similar sentence creating apparatus 1a and a translating apparatus 2.

The similar sentence creating apparatus 1a includes a to-be-replaced sentence acceptor 10a, the to-be-substituted candidate extractor 11, the context dependence ratio comparator 12, the context dependence determiner 13, the language model comparator 14, the replacement determiner 15, the replacement result outputer 16, a data updater 17, the to-be-substituted candidate dictionary 21, the context dependence ratio dictionary 22, and the language model database 23. The translating apparatus 2 includes a parallel corpus creator 31, a translation model creator 32, a to-be-translated sentence acceptor 33, a machine translator 34, a translation result sentence outputer 35, a translation result evaluator 36, and a feedback data creator 37.

The similar sentence creating apparatus 1a creates a similar sentence from a to-be-replaced sentence (original sentence), and if the similar sentence is determined to be applicable, outputs the similar sentence and the like to the translating apparatus 2. The translating apparatus 2 translates an arbitrary to-be-translated sentence to create a translation result sentence by using a translation model created from the similar sentence that the similar sentence creating apparatus 1a has determined to use and from a translated sentence resulting from the translation of the original sentence, from which the similar sentences have been created, in a desired language. The translating apparatus 2 then creates feedback information, which includes language information related to at least one of the language of the to-be-translated sentence and the language of the translation result sentence also includes evaluation information for the language information, according to an evaluation result for the translation result sentence, and feeds back the created feedback information to the similar sentence creating apparatus 1a. The similar sentence creating apparatus 1a updates data in at least one of the to-be-substituted candidate dictionary 21, context dependence ratio dictionary 22, and language model database 23, according to the feedback information.

The similar sentence creating apparatus 1a in FIG. 6 differs from the similar sentence creating apparatus 1 in FIG. 1 in that the data updater 17, which updates data in the to-be-substituted candidate dictionary 21, context dependence ratio dictionary 22, and language model database 23, is added and that the to-be-replaced sentence acceptor 10a not only accepts a to-be-replaced sentence but also outputs a translated sentence created from the accepted to-be-replaced sentence (original sentence) to the translating apparatus 2. In other respects, the similar sentence creating apparatus 1a is similar to the similar sentence creating apparatus 1, so the same components as with the similar sentence creating apparatus 1 are denoted by the same reference numerals and detailed descriptions will be omitted.

The to-be-replaced sentence acceptor 10a, which accepts a certain manipulation input made by the user, accepts a to-be-replaced sentence entered by the user and outputs the to-be-replaced sentence to the to-be-substituted candidate extractor 11. Subsequent processing performed for the to-be-replaced sentence by a series of components from the to-be-substituted candidate extractor 11 to the replacement result outputer 16 is similar to processing performed by a series of components from the to-be-substituted candidate extractor 11 to the replacement result outputer 16 in FIG. 1. The replacement result outputer 16 outputs, to the parallel corpus creator 31, the substituted sentence (similar sentence) created from the to-be-substituted character string candidate that the replacement determiner 15 has determined to be applicable.

The to-be-replaced sentence acceptor 10a, which accepts a certain manipulation input made by the user as described above, also outputs, to the parallel corpus creator 31, a translated sentence resulting from the translation of the original sentence, from which the substituted sentence has been created, in a desired language, that is, a translated sentence (translated sentence corresponding to the original sentence) created from the to-be-replaced sentence. For example, if the above to-be-replaced sentence is created in Japanese (source language) and the translating apparatus 2 performs translation from Japanese into English, the above translated sentence is created in English (target language). The source language and target language are not particularly limited to the above example. When the similar sentence creating apparatus 1a creates a similar sentence in English, English may be the source language and Japanese may be the target language. Alternatively, Chinese, Korean, French, German, Italian, Portuguese, and any other languages may be used.

The parallel corpus creator 31 relates a substituted sentence output from the replacement result outputer 16 and a translated sentence of the to-be-replaced sentence output from the to-be-replaced sentence acceptor 10a to each other to create a new parallel corpus, and output the created parallel corpus to the translation model creator 32. The method of creating a parallel corpus is not particularly limited to the above example. A new parallel corpus may be added to an already-created parallel corpus. Alternatively, any of various known methods may be used.

The translation model creator 32 uses the new parallel corpus created by the parallel corpus creator 31 to create a translation model through predetermined learning, and outputs the created translation model to the machine translator 34. Since any of various known methods can be used as the method of creating a translation model, detailed description will be omitted.

The to-be-translated sentence acceptor 33 accepts a certain manipulation input made by the user. Specifically, the to-be-translated sentence acceptor 33 accepts a to-be-translated sentence (source language sentence) entered by the user, and outputs the to-be-translated sentence to the machine translator 34. The machine translator 34 uses the translation model created by the translation model creator 32 to translate the to-be-translated sentence, and outputs a translation result sentence (target language sentence) to the translation result sentence outputer 35 together with the to-be-translated sentence. As a translation result, the translation result sentence outputer 35 outputs the translation result sentence to the translation result evaluator 36 together with the to-be-translated sentence.

The translation result evaluator 36 evaluates the translation accuracy and quality of the translation result sentence (target language sentence) output from the translation result sentence outputer 35. As an evaluation method used by the translation result evaluator 36, evaluation may be performed by using a mechanical numerical index. Alternatively, an evaluation result may be manually entered into the translation result evaluator 36. As an evaluation result, the translation result evaluator 36 outputs an evaluation value or evaluation information such as an evaluation category to the feedback data creator 37, in relation to at least one of the translation result sentence (target language sentence) and the to-be-translated sentence (source language sentence).

According to the evaluation result output from the translation result evaluator 36, the feedback data creator 37 creates, as feedback information, feedback data to be fed back to the similar sentence creating apparatus 1*a*, and outputs the created feedback data to the data updater 17. The feedback data is paired data composed of arbitrary language information about at least one of the source language and target language and evaluation information indicating a value or state related to the language information. Various types of data can be used as this feedback data. Data described below can be used.

If, for example, the translation result is bad, the user or a certain translation result correcting apparatus may correct the translation result sentence (target language sentence) and may enter a better translated sentence. Then, paired data composed of language information in which the entered translated sentence and the previous to-be-translated sentence (source language sentence) are paired and evaluation information indicating the state of the translation result (bad state) may be used as the feedback data.

Alternatively, the user or certain translation result correcting apparatus may correct the to-be-translated sentence (source language sentence) and may enter a to-be-translated sentence having the same intent as the previous to-be-translated sentence in a different representation. If a better translation result sentence can be obtained, paired data composed of language information in which the previous to-be-translated sentence (source language sentence) and the to-be-translated sentence (source language sentence) that has produced a good translation result are paired and evaluation information indicating the state of the translation result (a binary value indicating a good state or a bad state) may be used as the feedback data.

Alternatively, one or a plurality of sentences close to the to-be-translated sentence (source language sentence) may be extracted from the parallel corpus. Then, the user or certain translation result correcting apparatus may obtain an evaluation value (such as, for example, a binary value indicating a good state or a bad state) that indicates whether the extracted sentences are correct as source language sentences and may add the evaluation value to the extracted sentences close to the source language sentence. Then, paired data composed of this evaluation value and language information indicating the sentences close to the source language sentence may be used as the feedback data.

Alternatively, a plurality of translation result sentences may be created by the machine translator 34. Then, the user or certain translation result correcting apparatus may select a more appropriate translation result sentence from the created translation result sentences. Then, paired data composed of language information in which the selected translation result sentence and non-selected translation result sentences are paired and evaluation information indicating a selection result for these translation result sentences may be used as the feedback data.

The data updater 17 updates the contents of at least one of the to-be-substituted candidate dictionary 21, context dependence ratio dictionary 22, and language model database 23, according to the feedback data (paired data composed of language information and evaluation information indicating a value or state related to the language information) created by the feedback data creator 37.

If the feedback data includes a to-be-substituted character string candidate having context dependence, the data updater 17 updates the context dependence ratio dictionary 22 and language model database 23. If the feedback data includes a new sentence representation, the data updater 17 changes the value of the relevant context dependence ratio in the context dependence ratio dictionary 22, according to this sentence representation. The data updater 17 also updates the language model database 23 by partially structuring an N-gram in the language model database 23 so as to include the new sentence representation.

If the language information includes information about the source language and also includes information stored in the to-be-substituted candidate dictionary 21, context dependence ratio dictionary 22, or language model database 23, the data updater 17 makes an update, addition, or deletion for the corresponding information in the to-be-substituted candidate dictionary 21, context dependence ratio dictionary 22, or language model database 23, according to the evaluation information, indicating a value or state, in the corresponding feedback data.

If, for example, language information about the source language in which evaluation information indicating a positive (affirmative) value or state is included is fed back, the data updater 17 changes a value, in the language model database 23, that includes the language information in the positive direction by, for example, adding a certain weight to the appearance frequency to increase the value of the appearance frequency. By contrast, if language information about the source language in which evaluation information indicating a negative value or state is included is fed back, the data updater 17 changes a value, in the context dependence ratio dictionary 22, that includes the language information in the negative direction by, for example, updating the relevant context dependence ratio so that the ratio of context dependence is increased.

Paired information composed of language information about the previous to-be-translated sentence (source language sentence) that has produced a bad translation result and the to-be-translated sentence (source language sentence) that has produced a good translation result and evaluation information indicating the states of these translation results (bad translation result and good translation result) may be fed back. If a difference in the to-be-translated sentence that has produced a good translation result when compared with the previous to-be-translated sentence that has produced a bad translation result is not included in the to-be-substituted candidate dictionary 21, the data updater 17 stores the difference corresponding to the good result to the to-be-substituted candidate dictionary 21.

If paired data composed of language information about the to-be-translated sentence (source language sentence) that has produced a bad translation result and evaluation information indicating a state of the bad translation result is fed back, the data updater 17 deletes, from the to-be-substituted candidate dictionary 21, the to-be-substituted character string candidate corresponding to the to-be-translated sentence that has produced a bad translation result.

The structures of the similar sentence creating apparatus 1a and translating apparatus 2 are not particularly limited to an example in which they are structured with special hardware for each function as described above. The similar sentence creating apparatus 1a and translating apparatus 2 may be structured so that one or a plurality of computers or servers (information processing apparatuses) that each include a CPU, a ROM, a RAM, an auxiliary storage unit, and the like install similar sentence creating programs used to execute the above processing and function as a similar sentence creating apparatus or translation apparatus.

Figure 7:
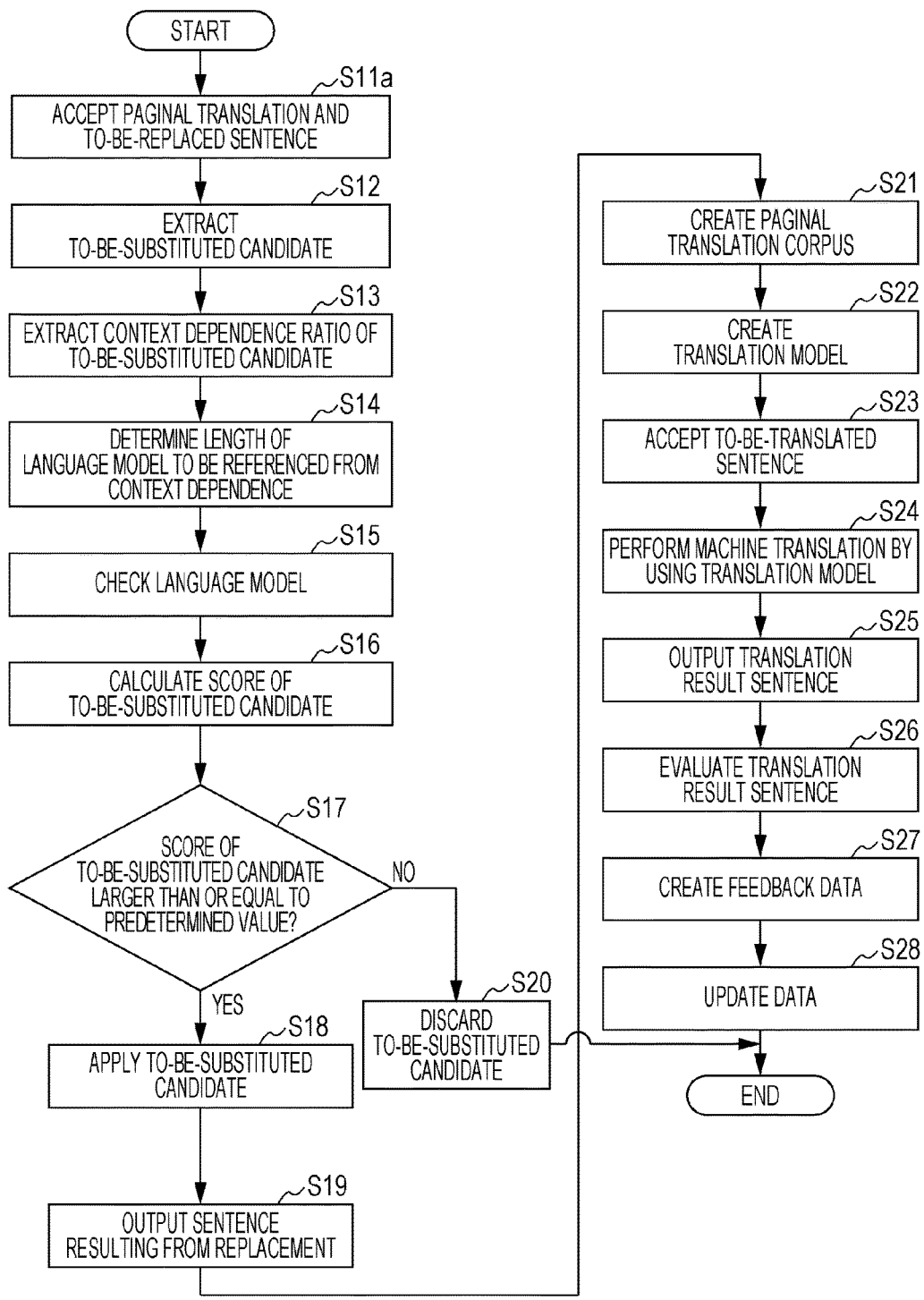
FIG. 7 is a flowchart illustrating an example of similar sentence creation processing, performed by the similar sentence creating system illustrated in FIG. 6, including feedback data update processing.

Next, similar sentence creation processing, performed by the similar sentence creating system structured as described, including feedback data update processing above will be described in detail. FIG. 7 is a flowchart illustrating an example of similar sentence creation processing, performed by the similar sentence creating system illustrated in FIG. 6, including feedback data update processing. In processing illustrated in FIG. 7, the same processing as in FIG. 5 is assigned the same symbols and detailed description will be omitted.

First, in step S11a, the to-be-replaced sentence acceptor 10a accepts a to-be-replaced sentence and a translated sentence corresponding to an original sentence, which have been entered by the user, as similar sentence creation processing performed by the similar sentence creating apparatus 1a, after which the to-be-replaced sentence acceptor 10a outputs the translated sentence to the parallel corpus creator 31 and also outputs the to-be-replaced sentence to the to-be-substituted candidate extractor 11. The timing at which to output the translated sentence to the parallel corpus creator 31 is not particularly limited to the above restriction; during processing in step S17, the to-be-replaced sentence acceptor 10a may output the translated sentence to the parallel corpus creator 31.

Next, in steps S12 to S17, processing similar to processing in steps S12 to S17 in FIG. 5 is executed. If it is determined in step S17 that the score (appearance frequency) of the to-be-substituted character string candidate is smaller than the predetermined threshold Th, the replacement result outputer 16 discards the to-be-substituted character string candidate in step S20, terminating the processing.

If it is determined in step S17 that the score (appearance frequency) of the to-be-substituted character string candidate is larger than or equal to the predetermined threshold Th, processing similar to processing in steps S18 in FIG. 5 is executed in step S18. Then, in step S19, the replacement result outputer 16 outputs, to the parallel corpus creator 31, a substituted sentence (sentence after the replacement) created from the to-be-substituted character string candidate that has been determined to be applicable by the replacement determiner 15, terminating the similar sentence creation processing by the similar sentence creating apparatus 1a.

Next, as feedback update processing by the translating apparatus 2 and similar sentence creating apparatus 1a, in step S21, the parallel corpus creator 31 associates the substituted sentence output from the replacement result outputer 16 and the translated sentence output from the to-be-replaced sentence acceptor 10a with each other to create a new parallel corpus, and outputs the created parallel corpus to the translation model creator 32.

Next, in step S22, the translation model creator 32 uses the new parallel corpus created by the parallel corpus creator 31 to create a translation model through learning, and outputs the created translation model to the machine translator 34.

Next, in step S23, the to-be-translated sentence acceptor 33, which accepts a to-be-translated sentence entered by the user, accepts an arbitrary to-be-translated sentence that the user wants to translate, and outputs the entered to-be-replaced sentence to the machine translator 34.

Next, in step S24, the machine translator 34 translates the to-be-translated sentence into a translation result sentence by using the translation model created by the translation model creator 32, and outputs the translation result sentence to the translation result sentence outputer 35 together with the to-be-translated sentence.

Next, in step S25, the translation result sentence outputer 35 outputs the translation result sentence to the translation result evaluator 36 together with the to-be-replaced sentence.

Next, in step S26, the translation result evaluator 36 evaluates the translation accuracy and quality of the translation result sentence output from the translation result sentence outputer 35, and outputs an evaluation value or information such as an evaluation category to the feedback data creator 37 as an evaluation result, in relation to the translation result sentence.

Next, in step S27, the feedback data creator 37 creates feedback data from the evaluation result output from the translation result evaluator 36, and outputs the feedback data to the data updater 17.

Finally, in step S28, the data updater 17 updates data in at least one of the to-be-substituted candidate dictionary 21, context dependence ratio dictionary 22, and language model database 23, according to the feedback information created by the feedback data creator 37, terminating the feedback data update processing.

In this embodiment, the above processing is performed to evaluate a translation result sentence translated from a certain to-be-translated sentence by using a translation model created from a substituted sentence determined to be used and from a translated sentence corresponding to an original sentence. According to the result of this evaluation, feedback information, which includes language information related to at least one of the language of the to-be-translated sentence and the language of the translation result sentence and also includes evaluation information for the language information. Therefore, it is possible to autonomously create feedback data used to have the similar sentence creating apparatus 1a learn examples for which context dependence is taken into consideration and to reflect these examples in the similar sentence creating apparatus 1a.

In this embodiment, the to-be-substituted candidate dictionary 21, context dependence ratio dictionary 22, and language model database 23 are updated by using feedback data, which includes language information and evaluation information, so it is possible to reflect examples for which context dependence is taken into consideration in the to-be-substituted candidate dictionary 21, context dependence ratio dictionary 22, and language model database 23 and thereby to autonomously identify similar sentences at a high efficiency even if a new text representation not present in any of the to-be-substituted candidate dictionary 21, context dependence ratio dictionary 22, and language model database 23 before they are updated is used.

The present disclosure can reduce a cost required to search a language model database, and can also identify similar sentences at a high efficiency. Therefore, the present disclosure is useful for a similar sentence creating method, a similar sentence creating program, a similar sentence creating apparatus, and a similar sentence creating system including the similar sentence creating apparatus, the method, program, apparatus, and system creating similar sentences from original sentences.

What is claimed is:

1. A method of creating similar sentences from an original sentence to be translated, the method comprising:
   accepting, by a processor, a first sentence including a first phrase;
   extracting, from a first database by the processor, one or more second phrases having the same meaning as the first phrase, the first phrase being part of a plurality of phrases constituting the first sentence, the first database associating phrases and synonyms of the phrases with each other;
   calculating, by the processor, an N-gram value according to a context dependence value corresponding to the one or more second phrases, the context dependence value being obtained from a second database, the second database associating phrases and context dependence values, corresponding to the phrases included in the second database, with each other, the context dependence value indicating a degree to which a meaning of a phrase included in the second database depends on context;
   extracting, by the processor, one or more contiguous third phrases that include a number of second phrases equivalent to the N-gram value from one or more second sentences obtained by replacing, in the first sentence, the first phrase with the one or more second phrases;
   calculating, by the processor, an appearance frequency of the one or more third phrases in a third database, the third database associating phrases and appearance frequencies of the phrases, in the third database, with each other;
   determining, by the processor, whether the calculated appearance frequency is larger than or equal to a threshold;
   determining, by the processor, if the calculated appearance frequency is determined to be larger than or equal to the threshold, the one or more second sentences as a substitute of the first sentence;
   outputting, by the processor, the one or more second sentences as the substitute, to an external device;
   generating, by the processor, an updated translation model based on the determination of the substitute; and
   perform, by the processor, a machine translation using the updated translation model.

2. The method according to claim 1, wherein:
   the first sentence is written in a first language;
   the first sentence is included in a parallel corpus, the parallel corpus including a plurality of pairs, each of which is composed of a sentence written in the first language and a translated sentence written in a second language; and
   if the calculated appearance frequency is determined to be larger than or equal to the threshold, the one or more second sentences are added to the parallel corpus as similar sentences of the first sentence.

3. The method according to claim 1, wherein:
   the third database includes an N-gram language model database;
   i (positive integer) is determined as N of the N-gram language model according to the context dependence value;
   the third database is referenced to obtain an appearance frequency of the N-gram including the second phrase; and
   whether to use the one or more second sentences as similar sentences of the first sentence is determined according to the appearance frequency of the N-gram including the second phrase.

4. The method according to claim 1, wherein:
   a translation result sentence is created by translating a predetermined to-be-translated sentence by use of the updated translation model, wherein the updated translation model is generated from the one or more second sentences determined to be used as similar sentences of the first sentence and from a translated sentence resulting from translation of the first sentence, from which the one or more second sentences have been created, in a second language;
   the translation result sentence is evaluated; and
   feedback information is created according to an evaluation result for the translation result sentence, the feedback information including language information related to at least one of a language of the to-be-translated sentence and a language of the translation result sentence as well as evaluation information for the language information.

5. The method according to claim 4, wherein at least one of the first database, the second database, and the third database is updated with the feedback information.

6. The method according to claim 4, wherein if the feedback information includes the second phrase with context dependence, the second database and the third database are updated.

7. The method according to claim 4, wherein if the feedback information includes a new sentence representation, a context dependence value in the second database is changed according to the new sentence representation.

8. The method according to claim 4, wherein if the feedback information includes a new sentence representation, the third database is updated so as to include the new sentence representation.

9. A non-transitory computer-readable recording medium storing a program that causes a computer to function as an apparatus that creates similar sentences from an original sentence to be translated, wherein the program causes the computer to execute processing to:
   accept a first sentence including a first phrase;
   extract, from a first database, one or more second phrases having the same meaning as the first phrase, the first phrase being part of a plurality of phrases constituting the first sentence, the first database associating phrases and synonyms of the phrases with each other;
   calculate an N-gram value according to a context dependence value corresponding to the one or more second phrases, the context dependence value being obtained from a second database, the second database associating phrases and context dependence values, corresponding to the phrases included in the second database, with each other, the context dependence value indicating a degree to which a meaning of a phrase included in the second database depends on context;

extract one or more contiguous third phrases that include a number of second phrases equivalent to the N-gram value from one or more second sentences obtained by replacing, in the first sentence, the first phrase with the one or more second phrases;

calculate an appearance frequency of the one or more third phrases in a third database, the third database associating phrases and appearance frequencies of the phrases, in the third database, with each other;

determine whether the calculated appearance frequency is larger than or equal to a threshold; and determine, if the calculated appearance frequency is determined to be larger than or equal to the threshold, the one or more second sentences as a substitute of the first sentence;

output the one or more second sentences as the substitute, to an external device;

generate an updated translation model based on the determination of the substitute; and perform a machine translation using the updated translation model.

10. An apparatus that creates similar sentences from an original sentence to be translated, the apparatus comprising:

an acceptor that accepts a first sentence including a first phrase;

a second phrase extractor that extracts, from a first database, one or more second phrases having the same meaning as the first phrase, the first phrase being part of a plurality of phrases constituting the first sentence the first database associating phrases and synonyms of the phrases with each other;

a calculator that calculates an N-gram value according to a context dependence value corresponding to the one or more second phrases, the context dependence value being obtained from a second database, the second database associating phrases and context dependence values, corresponding to the phrases included in the second database, with each other, the context dependence value indicating a degree to which a meaning of a phrase included in the second database depends on context;

a third phrase extractor that extracts one or more contiguous third phrases that include a number of second phrases equivalent to the N-gram value from one or more second sentences obtained by replacing, in the first sentence, the first phrase with the one or more second phrases;

a calculator that calculates an appearance frequency of the one or more third phrases in a third database, the third database associating phrases and appearance frequencies of the phrases, in the third database, with each other;

a determiner that determines whether the calculated appearance frequency is larger than or equal to a threshold;

an outputer that, if the calculated appearance frequency is determined to be larger than or equal to the threshold, uses the one or more second sentences as a substitute of the first sentence, and outputs the one or more second sentences as the substitute, to an external device;

a translation model creator that generates an updated translation model based on the determination of the substitute; and a machine translator that performs a machine translation using the updated translation model.

11. A system that creates similar sentences from an original sentence to be translated, the system comprising:

the apparatus according to claim 10;

wherein the translator that creates a translation result sentence by translating a predetermined to-be-translated sentence by use of the updated translation model, the updated translation model being generated from the one or more second sentences that the device has determined to use as similar sentences of the first sentence and from a translated sentence resulting from translation of the first sentence, from which the one or more second sentences have been created, in a second language;

an evaluator that evaluates the translation result sentence created by the translator; and a creator that creates feedback information including language information related to at least one of a language of the to-be-translated sentence and a language of the translation result sentence as well as evaluation information for the language information, according to an evaluation result from the evaluator.

* * * * *